(12) United States Patent
Nagahara et al.

(10) Patent No.: US 9,240,267 B2
(45) Date of Patent: Jan. 19, 2016

(54) POWER GENERATION DEVICE

(71) Applicant: PANASONIC CORPORATION, Osaka (JP)

(72) Inventors: Koichi Nagahara, Osaka (JP); Masaharu Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/295,956

(22) Filed: Jun. 4, 2014

(65) Prior Publication Data

US 2014/0285296 A1     Sep. 25, 2014

Related U.S. Application Data

(63) Continuation of application No. PCT/JP2012/007180, filed on Nov. 8, 2012.

(30) Foreign Application Priority Data

Dec. 9, 2011 (JP) ................................. 2011-269702

(51) Int. Cl.
*H01H 51/34* (2006.01)
*H01F 7/02* (2006.01)
*H02K 35/02* (2006.01)

(52) U.S. Cl.
CPC .............. *H01F 7/0231* (2013.01); *H02K 35/02* (2013.01)

(58) Field of Classification Search
CPC ....................................................... H02K 35/02

USPC ............................................................ 335/87
See application file for complete search history.

(56) References Cited

U.S. PATENT DOCUMENTS

| | | | | |
|---|---|---|---|---|
| 4,331,907 A | * | 5/1982 | Laux et al. | 315/400 |
| 4,602,174 A | * | 7/1986 | Redlich | 310/15 |
| 4,827,163 A | * | 5/1989 | Bhate et al. | 310/15 |
| 4,945,269 A | * | 7/1990 | Kamm | 310/15 |
| 5,394,131 A | * | 2/1995 | Lungu | 335/229 |
| 5,587,615 A | * | 12/1996 | Murray et al. | 310/30 |

(Continued)

FOREIGN PATENT DOCUMENTS

| | | |
|---|---|---|
| JP | 54-087865 A | 7/1979 |
| JP | 60-166116 U | 11/1985 |

(Continued)

OTHER PUBLICATIONS

International Search Report issued in International Application No. PCT/JP2012/007180 mailed Feb. 12, 2013, with English translation.

*Primary Examiner* — Alexander Talpalatski
(74) *Attorney, Agent, or Firm* — McDermott Will & Emery LLP (57) ABSTRACT

A power generation device includes a first magnet member, a second magnet member which is disposed such that the N pole side thereof is in the opposite direction to the N pole side of the first magnet member, a yoke which is disposed between the first magnet member and the second magnet member, an induction coil which is disposed at an outer periphery of the yoke. When the first magnet member and the second magnet member slidingly move in synchronization or when the yoke slidingly moves, the direction of a magnetic flux flowing in the yoke changes to generate an electromotive force in the induction coil.

6 Claims, 8 Drawing Sheets

(56) References Cited

U.S. PATENT DOCUMENTS

| | | | |
|---|---|---|---|
| 5,909,068 A * | 6/1999 | Wakiwaka et al. | 310/15 |
| 6,262,500 B1 * | 7/2001 | Wakiwaka et al. | 310/15 |
| 6,518,681 B2 * | 2/2003 | Ogino | 310/12.12 |
| 7,315,098 B2 * | 1/2008 | Kunita et al. | 310/15 |
| 7,498,681 B1 * | 3/2009 | Kellogg et al. | 290/1 R |
| 7,586,220 B2 * | 9/2009 | Roberts | 310/15 |
| 7,710,227 B2 | 5/2010 | Schmidt | |
| 8,593,017 B2 * | 11/2013 | Stefanini et al. | 310/15 |
| 2002/0175580 A1 * | 11/2002 | Ogino | 310/152 |
| 2008/0315595 A1 | 12/2008 | Bataille et al. | |

FOREIGN PATENT DOCUMENTS

| | | |
|---|---|---|
| JP | 61-076914 U | 5/1986 |
| JP | 2009-516802 A | 4/2009 |
| WO | 2011/069879 A1 | 6/2011 |
| WO | 2011/117031 A1 | 9/2011 |

* cited by examiner

POWER GENERATION DEVICE

This is a continuation of International Application No. PCT/JP2012/007180, with an international filing date of Nov. 8, 2012, which claims priority of Japanese Patent Application No. 2011-269702, filed on Dec. 9, 2011, the contents of each of which are hereby incorporated by reference.

BACKGROUND

1. Technical Field

The present disclosure relates to compact power generation devices for use in a wide range of electronic equipment, and operation devices and units for remote control of the equipment.

2. Description of the Related Art

In recent years, some of a wide range of electronic equipment, and operation devices and units for remote control of the equipment have increasingly been provided with built-in batteries for their operation. To address this trend, equipment manufacturers come to have increasing demands for development of compact-sized power generation devices.

Hereinafter, a conventional power generation device will be described with reference to FIG. 10.

Figure 10:
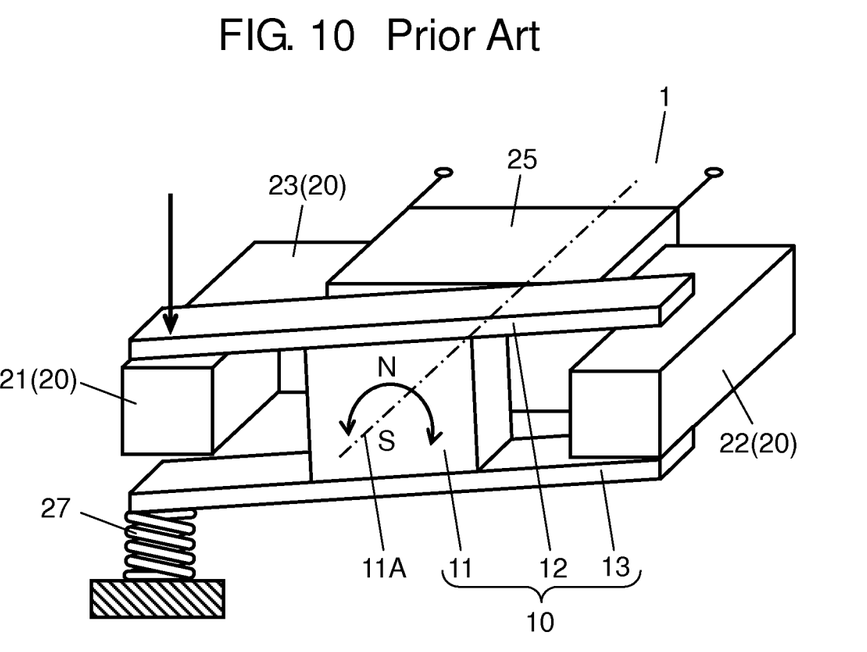
FIG. 10 is a schematic view of a conventional power generation device.

FIG. 10 is a schematic view of the conventional power generation device. As shown in FIG. 10, conventional power generation device 1 is provided with magnet member 10 servicing as a movable-side part and yoke member 20 servicing as a fixed-side part.

Magnet member 10 is configured including permanent magnet 11 such that the N pole and the S pole thereof are positioned in the upside and the downside, respectively. To the upper and lower surfaces of permanent magnet 11, upper plate 12 and lower plate 13 are respectively fixed, with the both being made of a magnetic substance. Then, magnet member 10 is rotatable in a clockwise/counterclockwise direction about rotation-axis line 11A that passes through the center of permanent magnet 11.

Yoke member 20 is one that is made of a magnetic substance and formed in a U-shape when viewed from the top, and that is disposed and fixed to such as a case (not shown). The yoke member has left leg 21 interposed between the left part of upper plate 12 and the left part of lower plate 13, and right leg 22 interposed between the right part of upper plate 12 and the right part of lower plate 13. Moreover, center part 23 connects left leg 21 and right leg 22. On the center part, induction coil 25 is wound.

Coil spring 27 is disposed on the lower surface of the left part of lower plate 13. In this way, power generation device 1 is configured with magnet member 10, yoke member 20 on which induction coil 25 is wound, and coil spring 27.

Power generation device 1 is capable of generating electric power by an electromotive force which is induced in induction coil 25 due to changes in a magnetic flux. The operation will be described hereinafter.

In power generation device 1 shown in FIG. 10, magnet member 10 is applied with a force by such as a pressing member (not shown) from the upper left side of upper plate 12, as indicated by the arrow in FIG. 10. Then, magnet member 10 remains at rest, with the left part thereof being lowered. That is, in this situation, the lower surface of the left part of upper plate 12 is in contact with left leg 21 of yoke member 20, while the upper surface of the right part of lower plate 13 is in contact with right leg 22. Moreover, coil spring 27 is pressed into a compressed state under the lower surface of the left part of lower plate 13. In a first state, the magnetic flux of permanent magnet 11 flows from the upside N pole through the left part of upper plate 12, through left leg 21, center part 23, and right leg 22 of yoke member 20, through the right part of lower plate 13, to the downside S pole of permanent magnet 11, in this order. Hereinafter, the state shown in FIG. 10 is referred to as the first state.

In the first state, when the applied force indicated by the arrow in FIG. 10 is removed, coil spring 27 is released from the compressed state, which allows magnet member 10 to rotate clockwise about rotation-axis line 11A. Then, the magnet member comes to rest in the state where the upper surface of the left part of lower plate 13 is in contact with left leg 21 of yoke member 20, while the lower surface of the right part of upper plate 12 is in contact with the right leg 22. Hereinafter, the state where coil spring 27 is released from the compressed state is referred to as the second state.

In the second state, the magnetic flux of permanent magnet 11 flows from the upside N pole through the right part of upper plate 12, through right leg 22, center part 23, and left leg 21 of yoke member 20, through the left part of lower plate 13, to the downside S pole of permanent magnet 11, in this order.

That is, upon turning to the second state, the magnetic flux inside yoke member 20 begins to flow in the opposite direction to that in the first state, which causes a change in the direction of the magnetic flux. Correspondingly to the change, a predetermined electromotive force is generated in induction coil 25. Through the use of the electromotive force, a predetermined electric power is obtained via coil wires at the both ends across induction coil 25.

Conversely, when the state is returned from the second state to the first state by rotating magnet member 10 counter-clockwise by such as pressing it with a pressing member, the magnetic flux in yoke member 20 begins to flow in the opposite direction to that in the second state. This also generates a predetermined electromotive force correspondingly in induction coil 25, allowing the predetermined electric power via the coil wires.

It is noted that Patent Literature 1, for example, is known as the information on the conventional technology related to the invention disclosed in the present application.

CITATION LIST

Patent Literature

Patent Literature 1: U.S. Pat. No. 7,710,227

SUMMARY

Conventional power generation devices are configured to generate electric power in such a manner that magnet member 10 servicing as a movable-side part rotates to induce an electromotive force in induction coil 25 which can generate the power. This configuration, however, has had a problem that these devices are difficult to thin in size.

An object of the present disclosure is to overcome such the problem and to provide power generation devices with a configuration capable of being made thinner in size.

To this end, the configuration according to the present disclosure is as follows.

According to one aspect of the present disclosure includes a first magnet member, a second magnet member with the N pole positioned in the opposite direction to that of the first magnet member, a yoke disposed between the first magnet member and the second magnet member, and an induction coil disposed at the periphery of the yoke. When the first magnet member and the second magnet member slidingly move in synchronization with each other, or alternatively the yoke slidingly moves, the direction in which the magnetic flux flows in the yoke changes to induce an electromotive force in the induction coil. This configuration allows, because of the sliding movement of the magnet members or the yoke, the power generation device to be made thinner in size.

According to the present disclosure, it is possible to provide the power generation device thinner in size.

DETAILED DESCRIPTION OF THE PREFERRED EMBODIMENT

Figure 1:
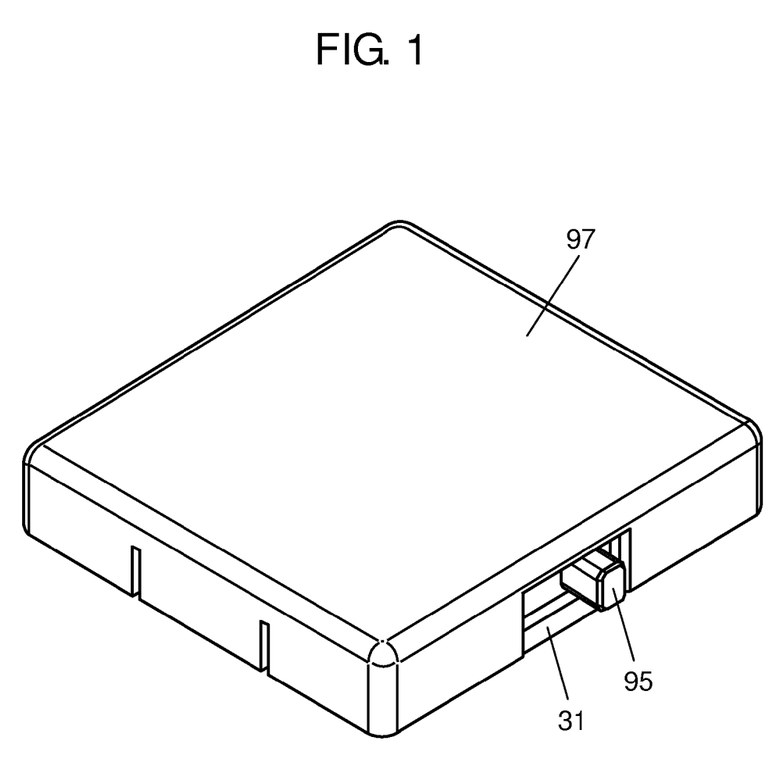
FIG. 1 is an external perspective view of a power generation device according to a embodiment.
Figure 2:
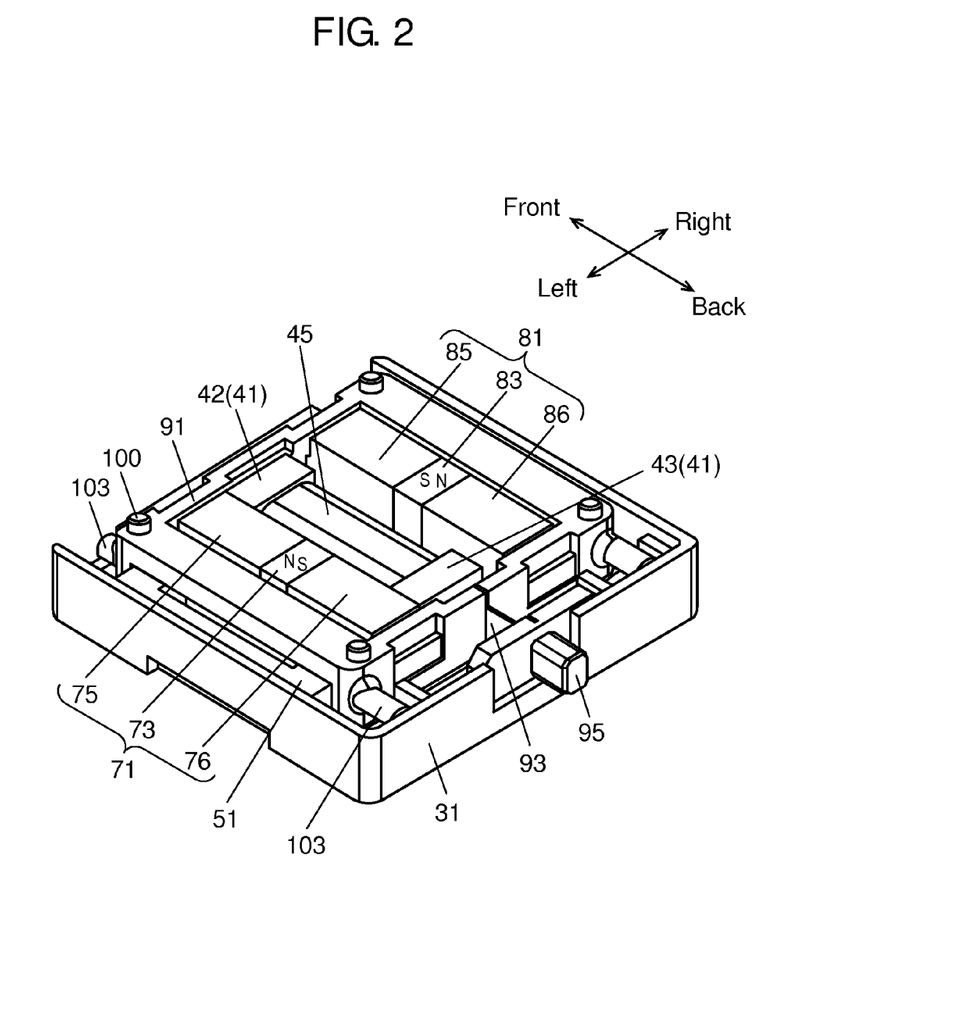
FIG. 2 is a perspective view of the power generation device, with a cover being removed, according to the embodiment.
Figure 3:
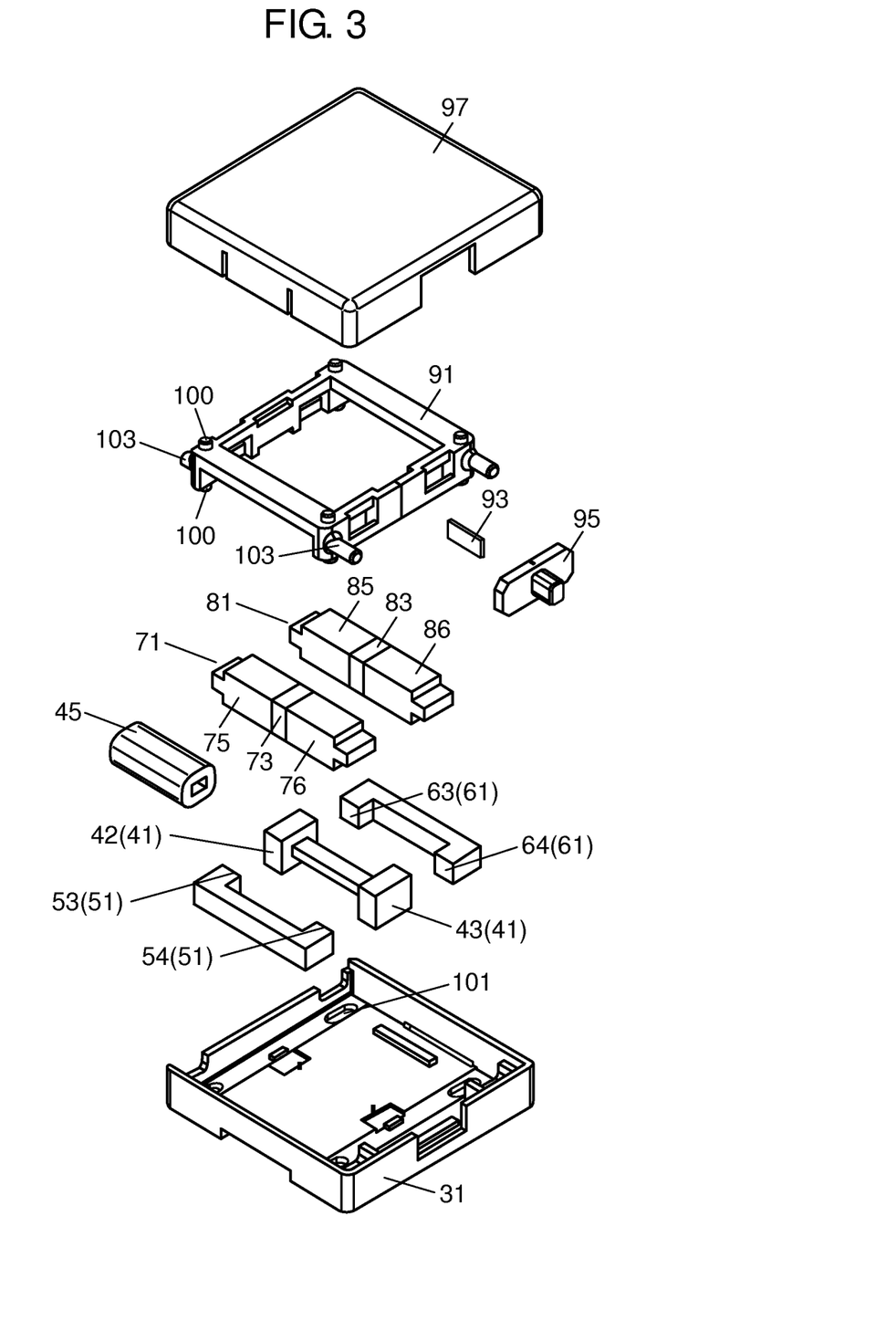
FIG. 3 is an exploded perspective view of the power generation device according to the embodiment.
Figure 4:
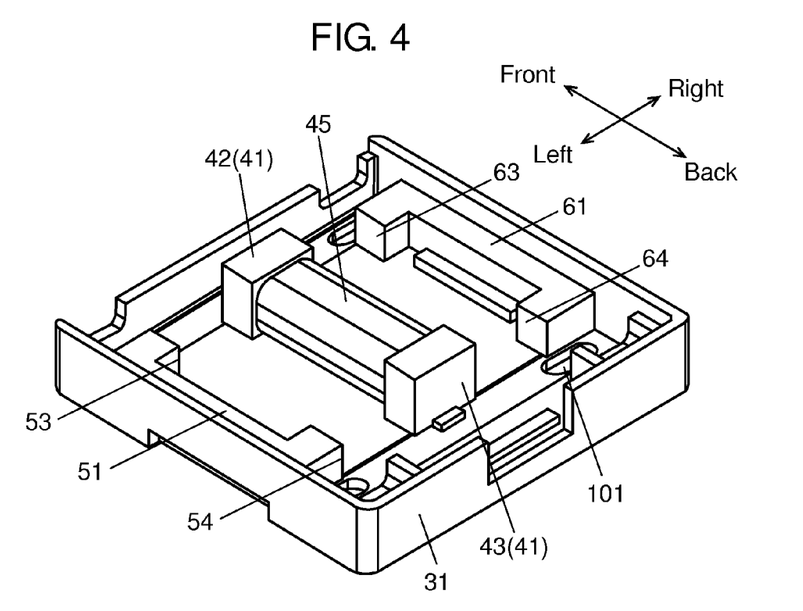
FIG. 4 is a perspective view of a major part of a fixed-side part of the power generation device according to the embodiment.
Figure 5:
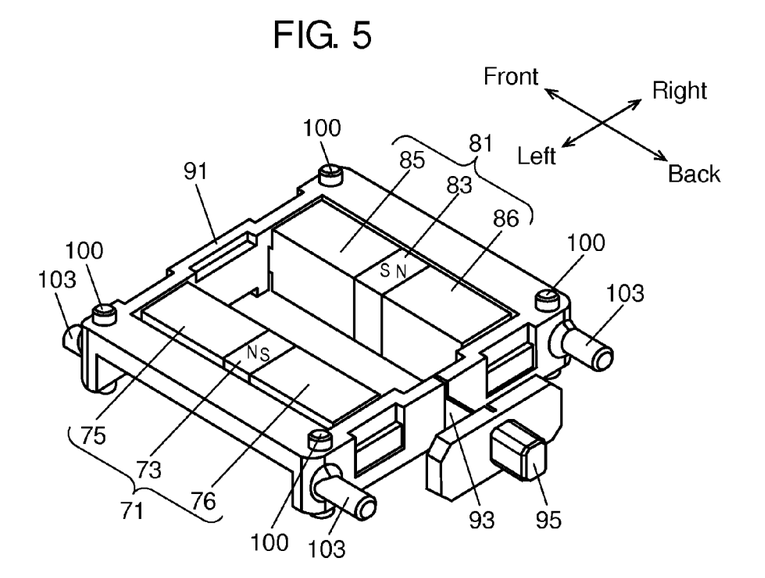
FIG. 5 is a perspective view of a major part of a movable-side part of the power generation device according to the embodiment.
Figure 6:
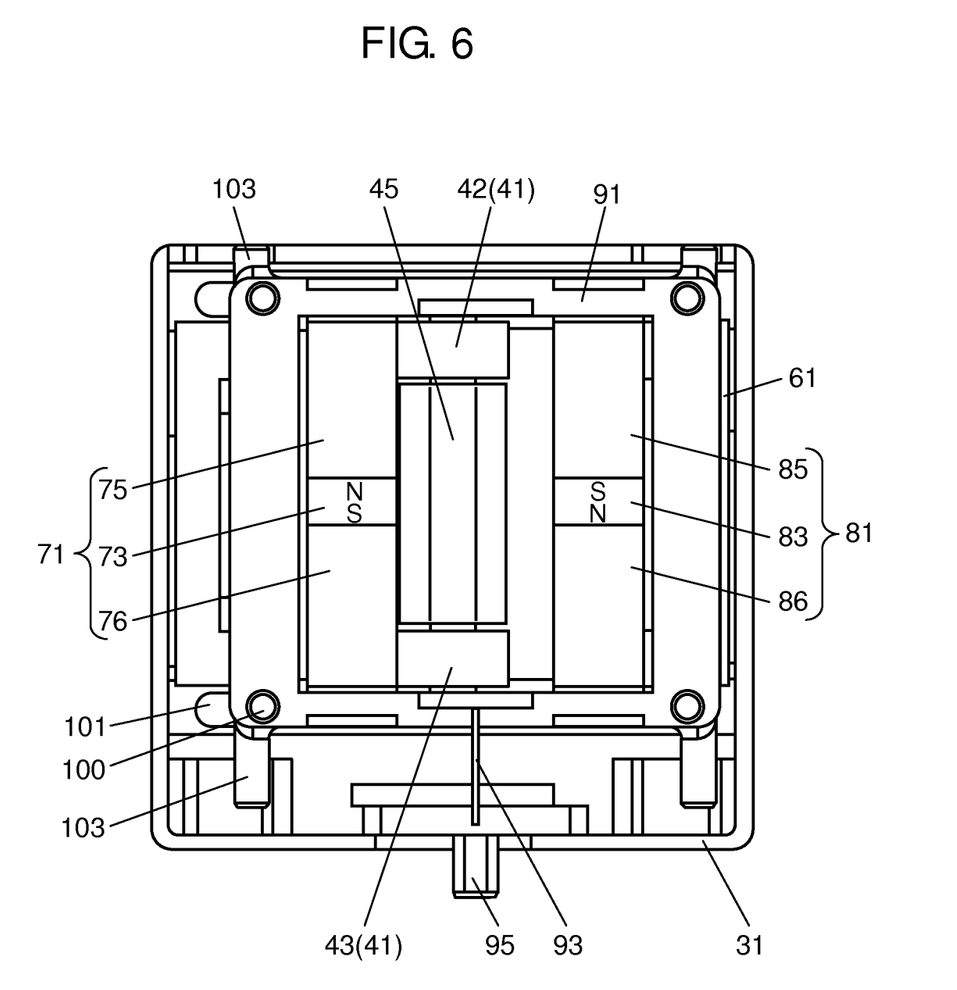
FIG. 6 is a top view illustrating a first state of the power generation device, with the cover being removed, according to the embodiment.
Figure 7:
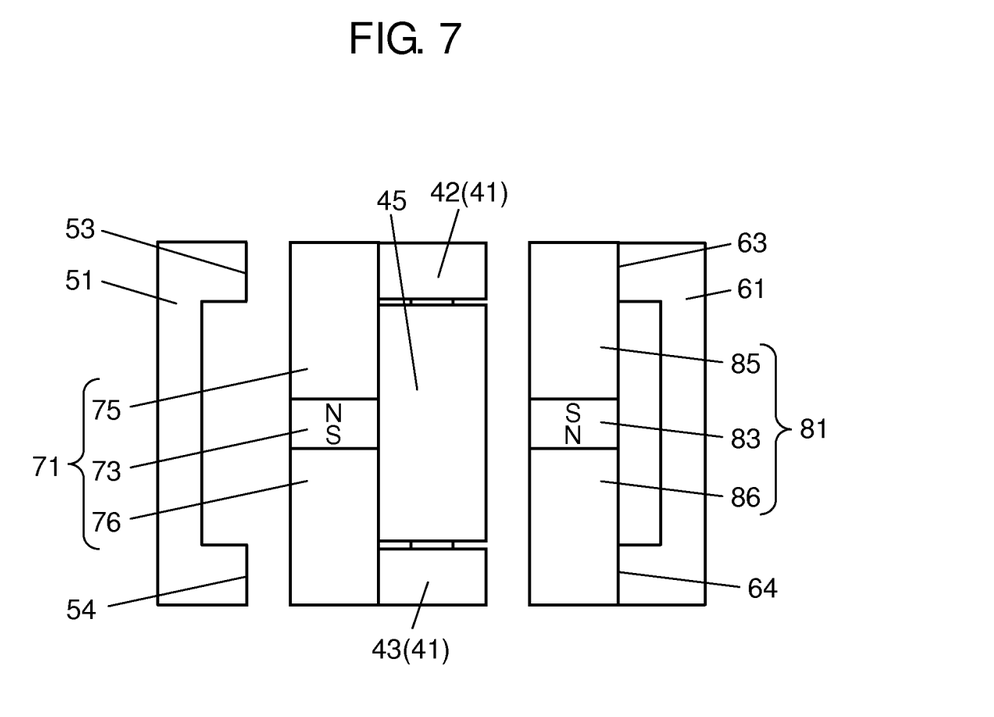
FIG. 7 is a schematic view illustrating a positional relation in the first state between magnet members and a yoke of the power generation device, according to the embodiment.
Figure 8:
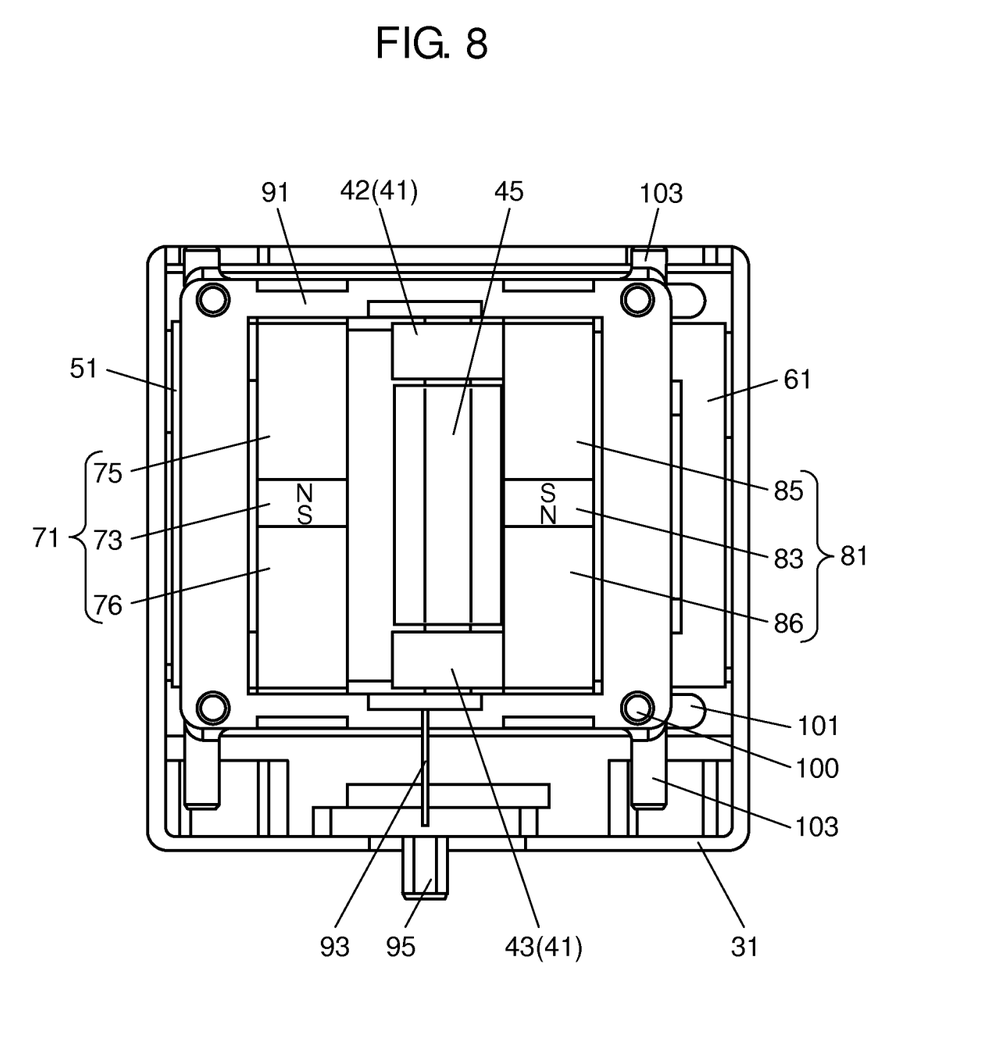
FIG. 8 is a top view illustrating a second state of the power generation device, with the cover being removed, according to the embodiment.
Figure 9:
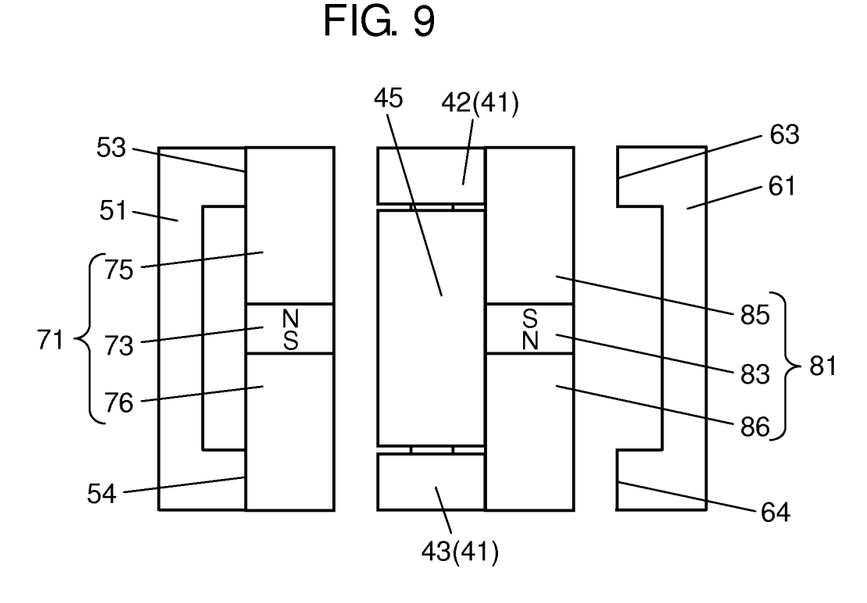
FIG. 9 is a schematic view illustrating a positional relation in the second state between the magnet members and the yoke of the power generation device, according to the embodiment.

Hereinafter, embodiments of the present invention will be described with reference to the accompanying drawings.
Exemplary Embodiment A embodiment will be described with reference to FIGS. 1 to 9. FIG. 1 is an external perspective view of a power generation device. FIG. 2 is a perspective view of the power generation device, with a cover being removed. FIG. 3 is an exploded perspective view of the device. FIG. 4 is a perspective view of a fixed-side part of the device. FIG. 5 is a perspective view of a movable-side part of the device. FIG. 6 is a top view illustrating a first state of the device, with the cover being removed. FIG. 7 is a schematic view illustrating a positional relation between magnet members and a yoke in the first state. FIG. 8 is a top view illustrating a second state of the power generation device, with the cover being removed. FIG. 9 is a schematic view illustrating a positional relation between the magnet members and the yoke in the second state.

As shown in FIG. 4, case 31 made of resin has a box shape with an upside rectangular opening. In the inside of a recess of case 31, rod-like center yoke 41 made of a magnetic substance is fixed with an adhesive or the like. Note that, in the following descriptions, the direction along the longitudinal direction of center yoke 41 is defined as the front-back direction, while the direction perpendicular to the longitudinal direction in plan view is defined as the left-right direction.

Center yoke 41 is disposed and fixed at the center in the left-right direction of the recess of case 31 such that the longitudinal direction of the yoke is parallel to the front-back direction (see FIG. 4 and others). Front end 42 and back end 43 of the longitudinal sides of the center yoke are each formed in the same quadrangular-prism shape that is larger in size than the midsection of the yoke. The left- and right-side surfaces of front end 42 and back end 43 are each a vertical flat surface.

At the periphery of the midsection between front end 42 and back end 43 of center yoke 41, induction coil 45 is disposed. Induction coil 45 is fixed to center yoke 41. Induction coil 45 used herein is small in dimension enough to be accommodated within a space defined by the up-down and left-right dimensions of both front end 42 and back end 43. Coil wires coming from the both ends of the induction coil are fixed at connection parts that are disposed on the inner bottom surface of case 31, and are connected to terminals of case 31.

In the left end of the inside of case 31, first auxiliary yoke 51 is fixed with an adhesive or the like (see FIG. 4 and others). The first auxiliary yoke has a U-shape in top view, with the top opening side of the U-shape facing center yoke 41. The lateral sides facing each other of the U-shape are each formed in the same quadrangular-prism shape; the lateral sides are parallel to each other and extend toward the right side. End 53 and end 54 of the U-shaped auxiliary yoke are opposed to the left-side surfaces of front end 42 and back end 43, respectively, at a predetermined distance. End 53 and end 54 of first auxiliary yoke 51 as well are each formed to be a vertical flat surface.

Like this, in the right end of the inside of case 31, second auxiliary yoke 61 is fixed with such as an adhesive (see FIG. 4 and others). The second auxiliary yoke has a U-shape in top view, with the top opening side of the U-shape facing center yoke 41. The lateral sides facing each other of the U-shape are each formed in the same quadrangular-prism shape; the lateral sides are parallel to each other and extend toward the left side. End 63 and end 64 of the U-shape are opposed to the right-side surfaces of front end 42 and back end 43, respectively, at the same distance as that for first auxiliary yoke 51. End 63 and end 64 of first auxiliary yoke 61 as well are each formed to be a vertical flat surface.

As described above, the major part of the fixed-side part is configured in this way. Next, the movable-side part that is movably combined with the fixed-side part will be described with reference to FIG. 5.

As shown in FIG. 5, the major part of the movable-side part is configured including first magnet member 71, second magnet member 81, and driving member 91 to hold both the magnet members. The first and second magnet members are each formed in a rod shape. The driving member is a rectangular frame made of resin.

First magnet member 71 is configured including permanent magnet 73 that is disposed at the center in the front-back direction of the first magnet member and that has a rectangular parallelepiped shape. To the front and back end surfaces of the permanent magnet 73, magnetic substances 75 and 76 are respectively fixed which are formed in the same quadrangular-prism shape. Here, permanent magnet 73 is disposed such that the front side thereof is the N pole while the back side thereof is the S pole; therefore, the magnetic substance 75 side of the first magnet member is the N pole, while the magnetic substance 76 side of the first magnet member is the S pole. The total length of the first magnet member is approximately equal to center yoke 41. It is noted that permanent magnet 73 is preferably disposed at the center of the first magnet member because this arrangement allows the commonality of magnetic substances 75 and 76; however, the arrangement of permanent magnet 73 is not particularly limited. Note, however, that the first magnet member may be configured only with a permanent magnet, without magnetic substances 75 and 76.

Second magnet member 81 includes permanent magnet 83 having a rectangular parallelepiped shape that is disposed at the center of the second magnet member in the front-back direction. Although second magnet member 81 has the same configuration as that of first magnet member 71, its configuration is different from that of first magnet member 71 in that permanent magnet 83 is arranged to have the opposite orientation to that of permanent magnet 73. That is, permanent magnet 83 of second magnet member 81 is disposed such that the front side thereof is the S pole, while the back side thereof is the N pole. Therefore, the second magnet member is such that the magnetic substance 85 side thereof is the S pole, while the magnetic substance 86 side thereof is the N pole. Here, magnetic substance 85 and magnetic substance 86 each have the same quadrangular-prism shape, and are respectively fixed to the front and back end surfaces of permanent magnet 83. The total length of the second magnet member is approximately equal to center yoke 41. Note that, as well as first magnet member 71, although the configuration of second magnet member 81 is not particularly limited, permanent magnet 83 is preferably disposed at the center of the second magnet member, which allows the commonality of magnetic substances 85 and 86. Moreover, the second magnet member may be configured only with a permanent magnet.

First magnet member 71 and second magnet member 81 are disposed parallel to each other with a predetermined distance in the left-right direction, and are fixed to driving member 91 made of resin or that like that has a rectangular frame shape in top view (see FIG. 5 and others). That is, first magnet member 71 and second magnet member 81 are disposed parallel to each other, along the front-back direction. In the front side, the N pole side of first magnet member 71 and the S pole side of second magnet member 81 are opposed to each other with the aforementioned predetermined distance in the left-right direction. In the back side, the S pole side of first magnet member 71 and the N pole side of second magnet member 81 are opposed to each other with the aforementioned predetermined distance in the left-right direction. Note, however, that the method of holding and fixing both first magnet member 71 and second magnet member 81 to driving member 91 is not particularly limited.

Driving member 91 that holds both first magnet member 71 and second magnet member 81 is integrated into case 31, sliding-movably in the left-right direction. FIG. 2 shows the state after integration. In the state after integration, as shown in FIGS. 6, 7, and others, center yoke 41 is positioned between first magnet member 71 and second magnet member 81. Then, first magnet member 71, second magnet member 81, and center yoke 41 are positioned parallel to each other along the front-back direction. Moreover, first magnet member 71 is positioned between center yoke 41 and first auxiliary yoke 51, while second magnet member 81 is positioned between center yoke 41 and second auxiliary yoke 61.

As shown in FIG. 6 and others, driving member 91 of the movable-side part holds one end of plate spring 93, at the rear-side center of the frame-like part of the driving member. Then, the other end of plate spring 93 protrudes backward, and the tip of the other end is held by operation member 95 that is used to move driving member 91 in the left-right direction. Operation member 95 has an operation part which protrudes backward to the outside of case 31. In this way, the major part of the movable-side part is configured.

Then, cover 97 made of resin is placed, from the top, to cover case 31 and driving member 91, and is bonded to case 31 (see FIGS. 1 and 3). In this configuration, because first magnet member 71 and second magnet member 81 respectively include permanent magnets 73 and 83, either first magnet member 71 or second magnet member 81 is sticking to center yoke 41 in the usual state (the first state), which allows the movable-side part to be in a stable rest state. In the following description, the state shown in FIGS. 1 to 7 where first magnet member 71 sticks to center yoke 41 is referred to as the first state.

In the first state, as shown in FIG. 6, driving member 91 is positioned at the right side of the inside of case 31. The operation part of operation member 95 is also positioned at the right side via plate spring 93 in the absence of load.

In the first state, as shown in FIGS. 6 and 7, first magnet member 71 is in the state where the left-side surface near the front end of magnetic substance 75 and the left-side surface near the back end of magnetic substance 76 are respectively away from the ends 53 and 54 of first auxiliary yoke 51, and where the right-side surface near the front end of magnetic substance 75 and the right-side surface near the back end of magnetic substance 76 are respectively in contact with and sticking to the left-side surfaces of front end 42 and back end 43 of center yoke 41. The portion at which first magnet member 71 is sticking to center yoke 41 is referred to as the first sticking portion.

Second magnet member 81 is in the state where the left-side surface near the front end of magnetic substance 85 and the left-side surface near the back end of magnetic substance 86 are respectively away from the right-side surfaces of front end 42 and back end 43 of center yoke 41, and where the right-side surface near the front end of magnetic substance 85 and the right-side surface near the back end of magnetic substance 86 are respectively sticking to the ends 63 and 64 of second auxiliary yoke 61. The portion at which second magnet member 81 is sticking to second auxiliary yoke 61 is referred to as the second sticking portion.

In the first state shown in FIG. 7, the magnetic flux flows through center yoke 41, from front end 42 toward back end 43. That is, the magnetic flux flows in the following order: from permanent magnet 73 of first magnet member 71, through magnetic substance 75, front end 42 of center yoke 41, center yoke 41, and back end 43 of center yoke 41, to magnetic substance 76 of first magnet member 71. In the configuration according to the embodiment, each of the magnetic substances employs a kind of material that is chosen such that the magnetic flux flowing through center yoke 41 is not greatly hampered by the flux coming from second magnet member 81. In addition, it is configured that, in the first state, the flux coming from second magnet member 81 flows to return to second magnet member 81 via second auxiliary yoke 61.

In the first state, when the operation part of operation member 95 is operated to move horizontally toward the left direction, operation member 95 moves in the direction, which in turn causes plate spring 93 to bend correspondingly toward the left side.

Then, when the spring force of thus-bended plate spring 93 becomes stronger than the sum of the sticking forces at the first and second sticking portions, the first and second sticking portions are released from the sticking situation. Then, driving member 91 moves instantaneously toward the left side due to the spring force along the direction in which the operation member is moved, with the spring force acting on bended plate spring 93 and causing it to recover. That is, both first magnet member 71 and second magnet member 81 slidingly move horizontally toward the left side, in synchronization with each other. The state, as shown in FIGS. 8 and 9, after both first magnet member 71 and second magnet member 81 have slidingly moved horizontally to the left side, in synchronization, is referred to as the second state, hereinafter.

Also, in addition to this, after the movable-side part has passed the midpoint on the way to the left side, the following two attractive forces come to contribute to the instantaneous movement of driving member 91. That is, the attractive force between the left-side surfaces near the front and back ends of first magnet member 71 and respective ends 53 and 54 of first auxiliary yoke 51, respectively, and the attractive force between the left-side surfaces near the front and back ends of second magnet member 81 and front end 42 and back end 43 of center yoke 41, respectively.

After that, first magnet member 71 stops when the left-side surfaces near the front and back ends thereof become in contact with ends 53 and 54 of first auxiliary yoke 51, respectively. At the same time, second magnet member 81 stops when the left-side surfaces near the end and back ends thereof become in contact with the right-side surfaces of front end 42 and back end 43 of center yoke 41, respectively. Thus, the movement of driving member 91 toward the left side comes to a halt (the second state). In the second state, plate spring 93 has returned to the original state in the absence of load, and operation member 95 is positioned at the left side via plate spring 93. The second state is shown in FIGS. 8 and 9.

In the second state, as shown in FIGS. 8 and 9, the left-side surfaces near the front and rear ends of first magnet member 71 are in a state of respectively sticking to ends 53 and 54 of first auxiliary yoke 51 (a third sticking portion). On the other hand, the left-side surfaces near the front and rear ends of second magnet member 81 are in a state of respectively sticking to the right-side surfaces of front end 42 and back end 43 of center yoke 41 (a fourth sticking portion). As shown in FIG. 9, the sticking portion at which first magnet member 71 sticks to first auxiliary yoke 51 is referred to as the third sticking portion, while the sticking portion at which second magnet member 81 sticks to center yoke 41 is referred to as the fourth sticking portion.

Such the sticking of these portions allows the movable-side part to be held in a stable rest state, which is in the same manner as that in the usual state (the first state).

Upon turning to the second state shown in FIGS. 8 and 9, the direction in which the magnetic flux flows through center yoke 41 changes instantaneously to be opposite to that in the first state shown in FIGS. 6 and 7. That is, in the second state, the magnetic flux flows in center yoke 41 from rear end 43 toward front end 42. The magnetic flux of permanent magnet 83 of second magnet member 81 flows through magnetic substance 86, back end 43 of center yoke 41, center yoke 41, front end 42 of center yoke 41, to magnetic substance 85 of second magnet member 81, in this order.

Note, however, that each of the magnetic substances employs the kind of material that is chosen such that, also in the second state, the aforementioned magnetic flux flowing through center yoke 41 is not greatly hampered by the flux coming from first magnet member 71. In addition, it is configured that, in the second state, the flux coming from first magnet member 71 flows to return to first magnet member 71 via first auxiliary yoke 51, which is in the same manner as that in the first state.

As described above, in the embodiment, when the movable-side part is slidingly moved horizontally, from the first state to the second state, the direction of the flow of the magnetic flux through center yoke 41 is turned to be the opposite one. This change in the magnetic flux generates an electromotive force in induction coil 45 disposed in center yoke 41. Then, from the electromotive force generated in induction coil 45, electric power is obtained via the terminals (not shown) connected to the coil wire of induction coil 45. Because center yoke 41 is included in the fixed-side part, induction coil 45 is preferably disposed in the center yoke such that the connection portions between the coil wire and the terminals are not subjected to unnecessary loads.

The operation of returning the movable-side part, to the first state from the second state where the part is in the left side, is accomplished in the same manner except only for left-right symmetry; therefore, the description thereof is omitted. Upon returning, the direction of the flow of the magnetic flux through center yoke 41 is turned to be the opposite one instantaneously. In response to this, a corresponding electromotive force is generated in induction coil 45, allowing electric power via the terminals (not shown).

Although not shown in the embodiment, a guiding means is disposed to slidingly move driving member 91 in the left-right direction. Although the configuration of the guiding means is not particularly limited, a simple structure may be preferably employed. For example, in the configuration, guide pin 100 protruding in the up-down direction is disposed at each of the upper and lower surfaces of the corner portions of the frame-like part of driving member 91. The guide pins are guided by linear grooves (not shown) disposed in the ceiling surface of cover 97 and by linear grooves 101 disposed in the inner bottom surface of case 31, with these linear grooves extending in the left-right direction. Note, however, that linear grooves 101 may be through holes for larger insertion lengths of guide pins 100. The guiding means of this configuration is also expected to prevent unfavorable guiding operations in a grating/creaking state.

Moreover, in this configuration, circular cylinder 103 protruding in the front-back direction is disposed at each of the left and right ends of the front and back surfaces of driving member 91. Circular cylinders 103 are supported by steps disposed on the front and back walls of case 31, thereby providing a smooth sliding of driving member 91 held in the horizontal state. However, this configuration may be optionally employed as deemed appropriate. Alternatively, another configuration is possible where spherical projections are disposed at the upper and lower surfaces of driving member 91, or alternatively at the inner bottom surface of case 31 and the lower surface of cover 97. The spherical projections cause driving member 91 to be approximately in contact with the corresponding surfaces in the upper-lower direction, allowing the slidably-contacting movement of the driving member. Even in this configuration, it is possible to render the driving member capable of smoothly sliding, being held in the horizontal state.

As described above, in the configuration, the movable-side part is slidably moved in the left-right direction to generate the predetermined electromotive force, which allows the power generation device having a low-profile in the upper-lower dimension.

Note that, although the descriptions of the configuration have been made using the case where driving member 91 is moved by the spring force of plate spring 93 which is applied along the direction of the movement of the movable-side part, another spring member or elastic member having a different shape may be employed to have the same functions and effects. Alternatively, in the case where the slidingly-moving stroke is rather short, there is not always the need for plate spring 93, the elastic member, or the like described above, and the configuration may be without them.

Moreover, the movable-side part may be capable of automatically returning from the having-moved state to the usual state, through the use of a sprig member or an elastic member disposed in the configuration.

Note that, the above descriptions have been made using the configuration in which center yoke 41 is in the fixed state, while first magnet member 71 and second magnet member 81 slidingly move horizontally in synchronization. However, the fixed-side part and the movable-side part may be configured to play reverse roles. That is, the configuration may be such that: First magnet member 71 and second magnet member 81 are disposed and fixed, while center yoke 41 with induction coil 45 is disposed sliding-movably in the horizontal direction between the magnet members.

Moreover, both first auxiliary yoke 51 and second auxiliary yoke 61 in the fixed-side part may also be provided with induction coils, thereby generating electromotive forces. Furthermore, the fixed-side part may be configured without first auxiliary yoke 51 and second auxiliary yoke 61.

Note that, in the embodiment, although the shape of first magnet member 71 and second magnet member 81 has been described to be the rod-like one, their shape is not limited to it. The shape of first magnet member 71 and second magnet member 81 may be one that has a front end and a back end in the same manner as those of center yoke 41, for example. Note that, in the embodiment, although the shape of center yoke 41 has been described to be one that has front end 42 and back end 43, the shape is not limited to it. The shape of center yoke 41 may be a rod-like one which does not include front end 42 and back end 43, for example.

Moreover, up to this point, the descriptions have been made using the case where the profile of the device is so low in vertical dimension that the operation part to operate in the left-right direction is disposed to protrude backward. However, the operation part may be integrated with the upper or lower surface of driving member 91 to protrude in the up-down direction. Furthermore, the configuration concept according to the present invention is applicable to the case where the aforementioned configuration is implemented in vertical-orientation installation of the device, which provides a narrower width in size of the device.

The power generation device according to the present disclosure has advantages that it can be configured in a low profile. This is beneficial for applications including a wide range of electronic equipment, and operation devices and units for remote control the equipment.

What is claimed is:

1. A power generation device comprising:
   a first magnet member;
   a second magnet member, an N pole side of the second magnet member being disposed in an opposite direction to an N pole side of the first magnet member;
   a yoke disposed between and on a line connecting the first magnet member and the second magnet member; and
   an induction coil disposed at an outer periphery of the yoke, wherein:
   the yoke includes a first portion and a second portion,
   the first portion and the second portion are not surrounded by the induction coil,
   the first portion is positioned in a first direction from the induction coil,
   the second portion is positioned in a second direction opposite the first direction from the induction coil,
   when the first magnet member moves toward the first portion and the second portion, the second magnet member moved away from the first portion and the second portion, and
   when the second magnet member moves toward the first portion and the second portion, the first magnet member moves away from the first portion and the second portion.

2. The power generation device according to claim 1, wherein the yoke is fixed.

3. The power generation device according to claim 1 further comprising one of a spring and an elastic member for applying a force in a direction in which the first magnet member and the second magnet member slidingly move.

4. The power generation device according to claim 1, further comprising:
   a first auxiliary yoke; and
   a second auxiliary yoke,
   wherein the first magnet member is positioned between the yoke and the first auxiliary yoke, and the second magnet member is positioned between the yoke and the second auxiliary yoke.

5. The power generation device according to claim 1, wherein the first magnet member and the second magnet member are fixed.

6. The power generation device according to claim 5 further comprising:
   a first auxiliary yoke; and
   a second auxiliary yoke,
   wherein the first magnet member is positioned between the yoke and the first auxiliary yoke, and the second magnet member is positioned between the yoke and the second auxiliary yoke.

* * * * *